US012591218B2

(12) United States Patent
Kilfoy et al.

(10) Patent No.: US 12,591,218 B2
(45) Date of Patent: Mar. 31, 2026

(54) INDUSTRIAL DIGITAL TWIN MODEL ENVIRONMENT

(71) Applicant: Rockwell Automation Technologies, Inc., Mayfield Heights, OH (US)

(72) Inventors: Leo T Kilfoy, San Diego, CA (US); Michael J Tresh, Manchester, NH (US); Bruce T. McCleave, Jr., Mission Viejo, CA (US); Daniel C. Rischar, Mayfield Heights, OH (US); Stephen C. Briant, Moon Township, PA (US); Ryan P. Dunn, Mayfield Heights, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 305 days.

(21) Appl. No.: 18/350,058

(22) Filed: Jul. 11, 2023

(65) Prior Publication Data

US 2025/0021078 A1     Jan. 16, 2025

(51) Int. Cl.
G05B 19/4155          (2006.01)

(52) U.S. Cl.
CPC ................... G05B 19/4155 (2013.01); G05B 2219/31449 (2013.01)

(58) Field of Classification Search
None
See application file for complete search history.

(56) References Cited

U.S. PATENT DOCUMENTS

| | | | |
|---|---|---|---|
| 7,971,151 | B2 | 6/2011 | Nixon et al. |
| 10,333,820 | B1 | 6/2019 | Wang et al. |
| 11,074,322 | B1 | 7/2021 | R. et al. |
| 2007/0203846 | A1 | 8/2007 | Kavuri et al. |
| 2008/0077512 | A1 | 3/2008 | Grewal |
| 2009/0089701 | A1 | 4/2009 | Baier et al. |
| 2009/0327942 | A1 | 12/2009 | Eldridge et al. |
| 2011/0191255 | A1 | 8/2011 | Sowell |

(Continued)

OTHER PUBLICATIONS

Non-Final Office Action received for U.S. Appl. No. 18/355,581, dated Oct. 22, 2024, 33 pages.

(Continued)

*Primary Examiner* — Ryan A Jarrett
(74) *Attorney, Agent, or Firm* — Amin, Turocy & Watson, LLP

(57)          ABSTRACT

A cloud-based digital twin modeling and testing system is capable of hosting multiple applications that can be used to simulate and test versions of a control design prior to deployment, including but not limited to control programming applications, controller emulation applications, machine simulation applications, or other such platforms. The digital twin modeling environment renders an interface display that allows a user to easily build a testable digital model of a control system by connecting components of a proposed control project to these applications. The system also allows the user to define inputs and test scenarios to be executed as a simulation. Based on the connections, inputs, and test scenarios defined by the user, the modeling system leverages the hosted applications as needed to execute the defined test scenarios and generate predicted metrics for the proposed control system design.

20 Claims, 16 Drawing Sheets

(56) References Cited

U.S. PATENT DOCUMENTS

| | | |
|---|---|---|
| 2013/0036001 A1 | 2/2013 | Wegner et al. |
| 2013/0081045 A1 | 3/2013 | Jeong |
| 2014/0164607 A1 | 6/2014 | Bai et al. |
| 2014/0288998 A1 | 9/2014 | Paray |
| 2015/0281319 A1 | 10/2015 | Maturana et al. |
| 2021/0255611 A1 | 8/2021 | McGregor |
| 2022/0100171 A1 | 3/2022 | Miller et al. |
| 2022/0100181 A1 | 3/2022 | McGregor |
| 2022/0283784 A1* | 9/2022 | Degen ........................ G06F 8/20 |
| 2022/0404800 A1 | 12/2022 | Amaro, Jr. et al. |
| 2023/0342435 A1 | 10/2023 | Patange et al. |
| 2025/0004454 A1 | 1/2025 | Kilfoy et al. |

OTHER PUBLICATIONS

European Search Report for European Application No. EP24184638, dated Dec. 12, 2024.

Final Office Action received for U.S. Appl. No. 18/355,581, dated Feb. 21, 2025.

Non-Final Office Action received for U.S. Appl. No. 18/343,961, dated Aug. 15, 2025, 12 pages.

Non-Final Office Action received for U.S. Appl. No. 18/343,986, dated Sep. 11, 2025, 44 pages.

Final Office Action received for U.S. Appl. No. 18/343,961 dated Jan. 16, 2026, 14 pages.

Final Office Action received for U.S. Appl. No. 18/343,986 dated Jan. 15, 2026, 5 pages.

Non-Final Office Action received for U.S. Appl. No. 18/357,311 dated Jan. 7, 2026, 19 pages.

"Token Licensing Concepts and Management", IBM, Apr. 2020, pp. 1-12.

"OpenLM Token-based Licenses—OpenLM Software License Management", The Wayback Machine, 2022, 6 pages.

* cited by examiner

DIGITAL TWIN MODELING SYSTEM

CANVASES

1. CANVAS 1.0 – Running – User 1
2. CANVAS 1.1 – Idle – User 2
3. CANVAS 1.2 – Running – User 3

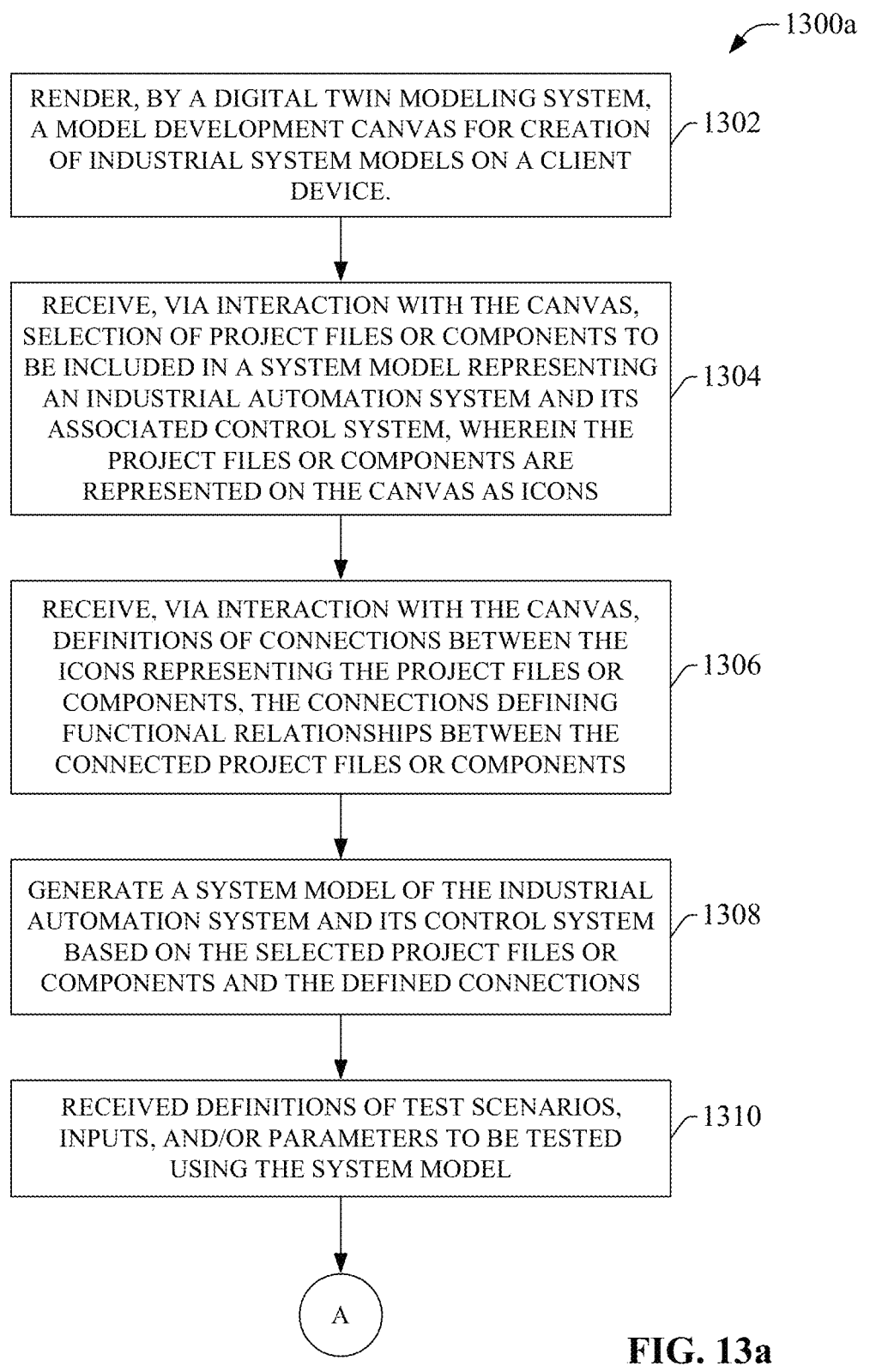

1300a

RENDER, BY A DIGITAL TWIN MODELING SYSTEM, A MODEL DEVELOPMENT CANVAS FOR CREATION OF INDUSTRIAL SYSTEM MODELS ON A CLIENT DEVICE. — 1302

RECEIVE, VIA INTERACTION WITH THE CANVAS, SELECTION OF PROJECT FILES OR COMPONENTS TO BE INCLUDED IN A SYSTEM MODEL REPRESENTING AN INDUSTRIAL AUTOMATION SYSTEM AND ITS ASSOCIATED CONTROL SYSTEM, WHEREIN THE PROJECT FILES OR COMPONENTS ARE REPRESENTED ON THE CANVAS AS ICONS — 1304

RECEIVE, VIA INTERACTION WITH THE CANVAS, DEFINITIONS OF CONNECTIONS BETWEEN THE ICONS REPRESENTING THE PROJECT FILES OR COMPONENTS, THE CONNECTIONS DEFINING FUNCTIONAL RELATIONSHIPS BETWEEN THE CONNECTED PROJECT FILES OR COMPONENTS — 1306

GENERATE A SYSTEM MODEL OF THE INDUSTRIAL AUTOMATION SYSTEM AND ITS CONTROL SYSTEM BASED ON THE SELECTED PROJECT FILES OR COMPONENTS AND THE DEFINED CONNECTIONS — 1308

RECEIVED DEFINITIONS OF TEST SCENARIOS, INPUTS, AND/OR PARAMETERS TO BE TESTED USING THE SYSTEM MODEL — 1310

INDUSTRIAL DIGITAL TWIN MODEL ENVIRONMENT

TECHNICAL FIELD

The subject matter disclosed herein relates generally to industrial automation systems, and, for example, to industrial information services.

BACKGROUND ART

Industrial automation systems can be disparate and complex, and typically integrate with many physical devices that generate and exchange data in connection with monitoring and controlling a manufacturing process. This challenging environment can make development of control systems on the OT level difficult, resulting in long development cycles in which new control system designs are developed, tested, and finally deployed. Moreover, current means for testing and predicting performance of a proposed control system design prior to deployment are limited and involve complicated workflows.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to render, on a client device, a design canvas, and to receive, via interaction with the design canvas, selections of industrial control project files to be included in a system model and definitions of connections between the industrial control project files, the industrial control project files comprising at least an industrial control program and a human-machine interface (HMI) application, and a virtual model of an industrial machine; a modeling component configured to generate the system model representing an industrial control system based on the industrial control project files and the connections between the industrial control project files; and a testing component configured to perform a test execution on the system model that simulates operation of the industrial control system and generates performance metric data for the system model based on the test execution, wherein the testing component is configured to execute portions of the system model using instances of applications hosted by the system, and the applications comprise at least a controller emulator application and a control program development application.

Also, one or more embodiments provide a method, comprising rendering, on a client device by a system comprising a processor, a design canvas; receiving, by the system via interaction with the design canvas, selections of industrial control project files to be included in a system model representing an industrial automation system, wherein the industrial control project files comprise at least an industrial control program and a human-machine interface (HMI) application, and a virtual model of an industrial machine; receiving, by the system via interaction with the design canvas, definitions of connections between the industrial control project files; generating, by the system, the system model based on the industrial control project files and the connections between the industrial control project files; performing, by the system, a test execution on the system model that simulates operation of the industrial automation system, wherein the performing comprises executing portions of the system model using instances of applications hosted by the system, and wherein the applications comprise at least a controller emulator application and a control program development application; and generating, by the system, performance metric data for the system model based on the test execution.

Also, according to one or more embodiments, a non-transitory computer-readable medium is provided having stored thereon instructions that, in response to execution, cause a system comprising a processor to perform operations, the operations comprising rendering, on a client device, a design canvas; receiving, via interaction with the design canvas, selections of industrial control project files to be included in a system model representing an industrial control system, wherein the industrial control project files comprise at least an industrial control program and a human-machine interface (HMI) application, and a virtual model of an industrial machine; receiving, via interaction with the design canvas, definitions of connections between the industrial control project files; generating the system model based on the industrial control project files and the connections between the industrial control project files; performing a test execution on the system model that simulates operation of the industrial automation system, wherein the performing comprises executing portions of the system model using instances of applications hosted by the system, and wherein the applications comprise at least a controller emulator application and a control program development application; and generating performance metric data for the system model based on the test execution.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 11 is an example canvas summary window that can be rendered by the digital twin modeling system.

FIG. 13*a* is a flowchart of a first part of an example methodology for digitally modeling an industrial automation system and its associated control system, and generating test executions on the resulting system model.

DETAILED DESCRIPTION

Figure 1:
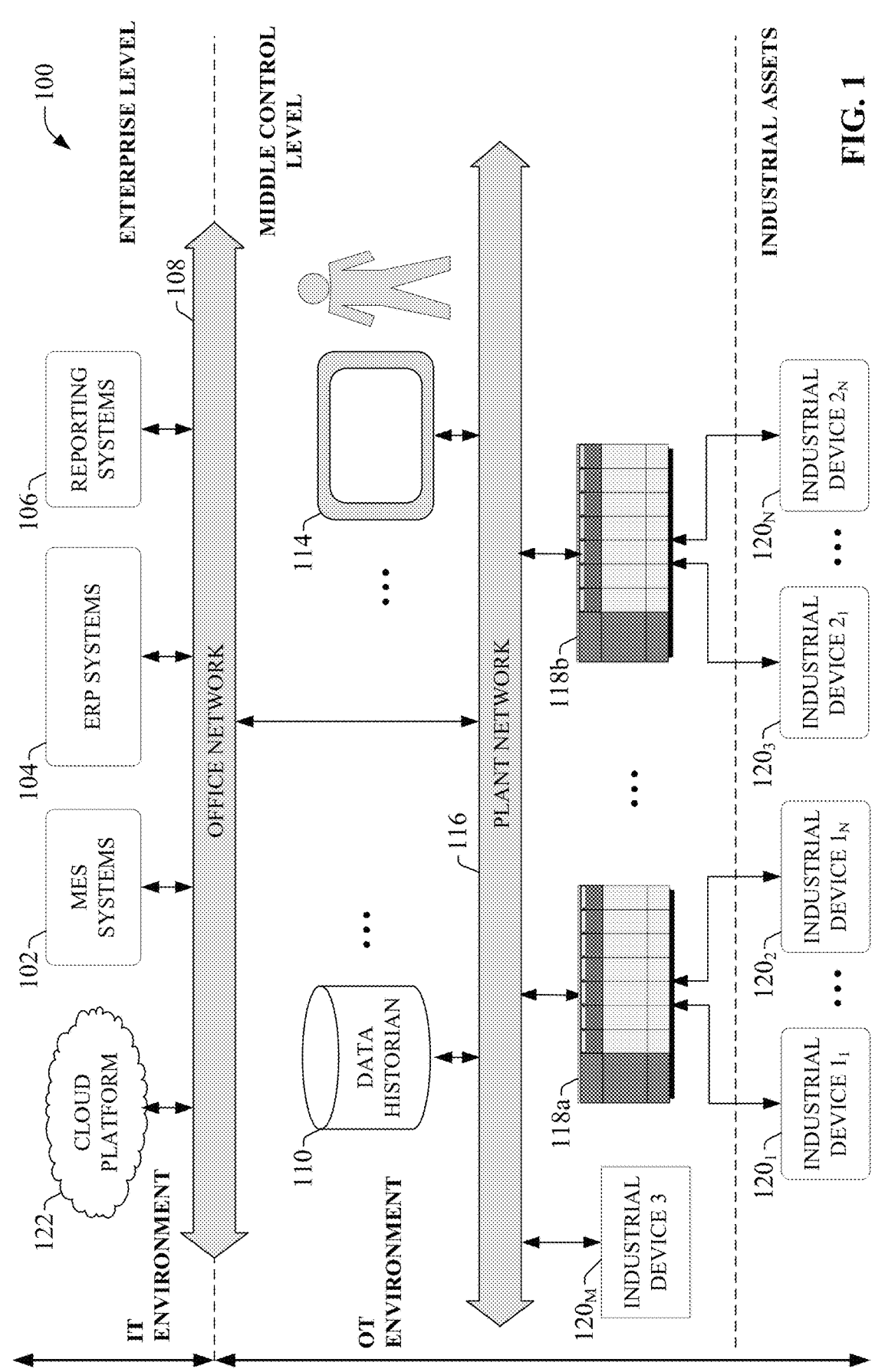
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network

116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

OT level systems can be disparate and complex, interfacing with many physical devices. This challenging environment can make development of control systems on the OT level difficult, resulting in long development cycles in which new control system designs are developed, tested, and finally deployed. Moreover, current means for testing and predicting performance of a proposed control system design prior to deployment are limited and involve complicated workflows.

To address these and other issues, one or more embodiments described herein provide a cloud-based digital twin modeling and testing system capable of hosting multiple applications that can be used to simulate and test versions of a control design prior to deployment, including but not limited to control programming applications, controller emulation applications, machine simulation applications, or other such platforms. The digital twin modeling environment renders an interface display that allows a user to easily build a testable digital model of a control system by connecting components of a proposed control project to these applications. The system also allows the user to define inputs and test scenarios to be executed as a simulation. Based on the connections, inputs, and test scenarios defined by the user, the system can leverage the hosted applications as needed to execute the defined test scenarios and generate predicted metrics for the proposed control system design (e.g., key performance indicators, product throughput, energy consumption, etc.).

Figure 2:
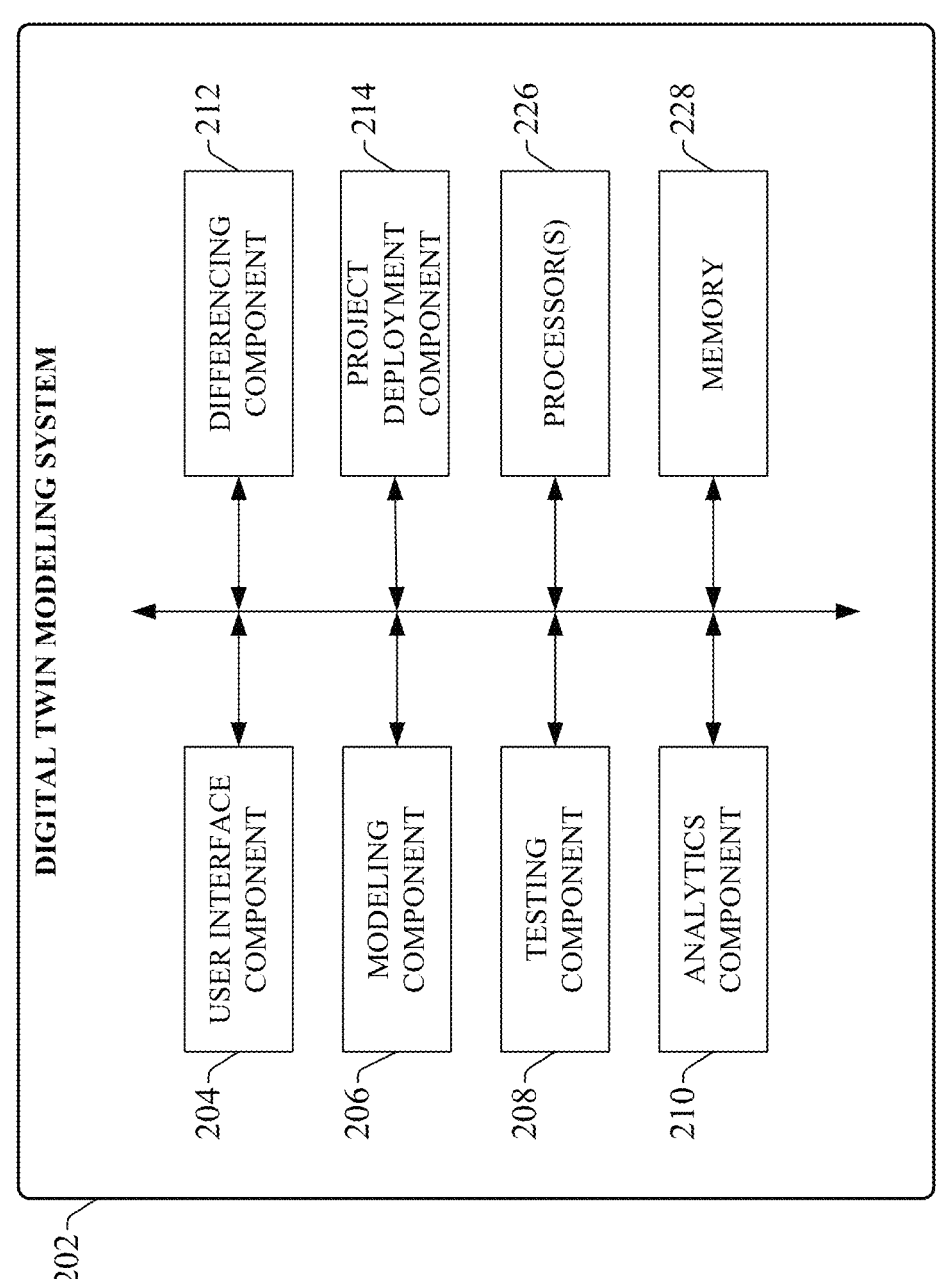
FIG. 2 is a block diagram of an example digital twin modeling system.

FIG. 2 is a block diagram of an example digital twin modeling system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Digital twin modeling system 202 can include a user interface component 204, a modeling component 206, a testing component 208, an analytics component 210, a differencing component 212, a project deployment component 214, one or more processors 226, and memory 228. In various embodiments, one or more of the user interface component 204, modeling component 206, testing component 208, analytics component 210, differencing component 212, project deployment component 214, the one or more processors 226, and memory 228 can be electrically and/or communicatively coupled to one another to perform one or more of the functions of the digital twin modeling system 202. In some embodiments, components 204, 206, 208, 210, 212, and 214 can comprise software instructions stored on memory 228 and executed by processor(s) 226. Digital twin modeling system 202 may also interact with other hardware and/or software components not depicted in FIG. 2. For example, processor(s) 226 may interact with one or more external user interface devices, such as a keyboard, a mouse, a display monitor, a touchscreen, or other such interface devices.

Digital twin modeling system 202 can be implemented on a cloud platform as a set of cloud-based services to facilitate access multiple users. The cloud platform on which the system 202 executes can be any infrastructure that allows shared computing services to be accessed and utilized by cloud-capable devices. The cloud platform can be a public cloud accessible via the Internet by devices having Internet connectivity and appropriate authorizations to utilize the modeling services. In some scenarios, the cloud platform can be provided by a cloud provider as a platform-as-a-service (PaaS), and the system 202 can reside and execute on the cloud platform as a cloud-based service. In some such configurations, access to the cloud platform and associated modeling services can be provided to customers as a subscription service by an owner of the system 202. Alternatively, the cloud platform can be a private cloud operated internally by the industrial enterprise (the owner of the plant facility). An example private cloud platform can comprise a set of servers hosting the system 202 and residing on a corporate network protected by a firewall.

User interface component 204 can be configured to receive user input and to render output to the user in any suitable format (e.g., visual, audio, tactile, etc.). In some embodiments, user interface component 204 can be configured to communicatively interface with a client device (e.g., a laptop computer, tablet computer, smart phone, etc.) that is communicatively connected to the modeling system 202 (e.g., via a hardwired or wireless connection). The user interface component 204 can then serve a model development environment, comprising a development canvas and associated modeling and testing tools, to the client device. Input data that can be received via the user interface component 204 can include, but is not limited to, model design input that selects components to be included in a digital system model of an automation system and associated control system, and that defines connections between the components representing functional relationships. Other input data can include editing input directed to components of the model (e.g., control programming edits, emulation settings, etc.), instructions to begin or end a test execution being performed on the model, definitions of operating scenarios to be tested or simulated, or other such input. Output data rendered by various embodiments of user interface component 204 can include graphical representations of model definitions, program code, control project recommendations, estimated performance metrics for a modeled control system, or other such outputs.

Modeling component 206 can be configured to generate a system model of an automation system and its associated control system based on modeling input submitted by a user. Testing component 208 can be configured to perform test executions that simulate operation of the automation system under control of the control system based on the system model, and to generate estimated performance metrics based on results of the test executions. Analytics component 210 can be configured to perform analytics on the results of the test executions to identify control system designs that best satisfy one or more estimated performance metrics, to infer design modifications that are predicted to improve one or more estimated performance metrics, or to generate other insights into the control system designs.

Differencing component 212 can be configured to identify design differences between two system models representing respective two versions of a control system design, and to render a model representation that graphically indicates the differences between the two designs. Project deployment component 214 can be configured to deploy executable software components of a system model to physical devices of the control system for execution.

The one or more processors 226 can perform one or more of the functions described herein with reference to the systems and/or methods disclosed. Memory 228 can be a computer-readable storage medium storing computer-executable instructions and/or information for performing the functions described herein with reference to the systems and/or methods disclosed.

Figure 3:
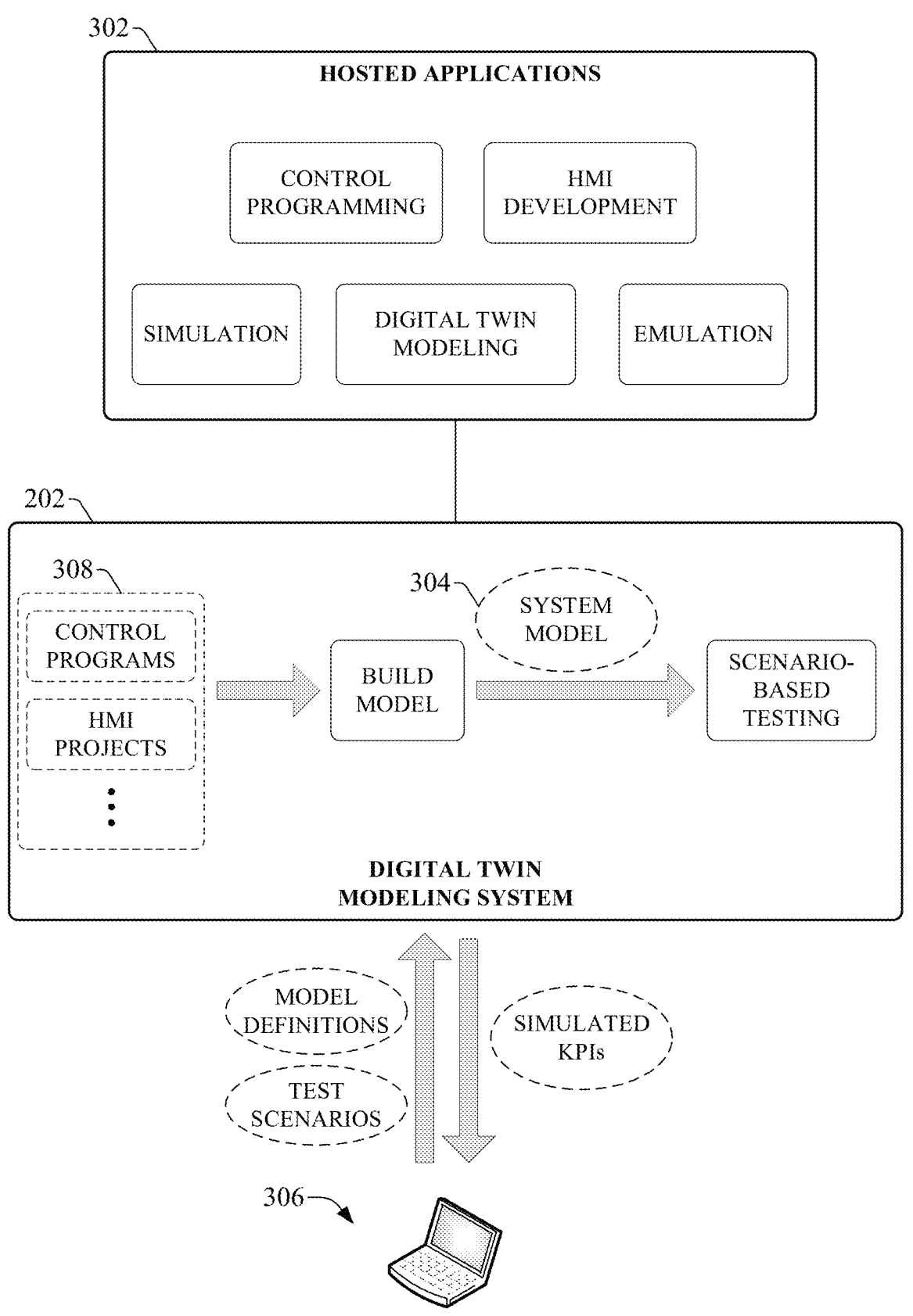
FIG. 3 is a diagram illustrating a generalized architecture of the industrial digital twin modeling system.

FIG. 3 is a diagram illustrating a generalized architecture of the industrial digital twin modeling system 202 according to one or more embodiments. Some embodiments of the modeling system 202 can execute on a cloud platform as a set of cloud-based modeling, testing, and storage services. A client device 306 (e.g., a laptop computer, tablet computer, desktop computer, mobile device, wearable AR/VR appliance, etc.) can access the system's project modeling and analysis tools and leverage these tools to develop or import elements of an industrial control project (e.g., industrial control programs, HMI applications, device configurations, etc.), create a system model 304 or digital twin using these elements, and perform scenario-based testing on the resulting model 304. To this end, the system's user interface component 204 can generate and render modeling interface displays that serve as an interface to the system 202.

The modeling system 202 allows a user to import project files 308 of an industrial control project. These project files 308 can include control program files intended for execution on an industrial controller (e.g., ladder logic programs, sequential function charts, structured text programs, function block diagrams, etc.) to facilitate monitoring and control of an industrial automation system or process, device configuration data (e.g., industrial controller configuration files, motor drive configuration files, etc.), visualization applications (e.g., HMI applications, AR/VR content, etc.), or other such control project data. In some scenarios, one or more of these project files 308 may be developed using separate development applications—e.g., industrial control program development applications, HMI development applications, etc.—and imported into the system 202 for modeling and testing. Alternatively, some embodiments of the system 202 can include integrated development platforms that allow a user to develop one or more of the project files 308 using the system's integrated development services.

The digital twin modeling system 202 can also host, or link to, multiple different industrial development and testing applications 302. In some embodiments these hosted applications 302 may reside and execute on the same cloud platform as the system 202. Alternatively, the applications 302 may execute as services that are external to the system 202, and can be remotely accessed by the modeling system 202 as needed. These applications 302 can include, for example, industrial control programming applications, HMI development applications, controller emulation applications, industrial simulation applications, or other such applications. The user can interact with the system's modeling interface to build a system model 304 of the control system by linking elements of the control project, including the control project files 308 and the hosted applications 302. The user can also define operational scenarios of interest to be simulated and evaluated using the system model 304. The system 202 can then perform test executions or simulations on the model 304 based on the defined test scenarios—leveraging the hosted applications 302 to execute portions of the model 304 as needed—and generate predicted performance metrics for the control system design based on results of these test executions. Performance metrics that can be estimated by the system 202 based on scenario-based testing or simulation of the model 304 can include, but are not limited to, key performance indicators (KPIs) of the automation system under control of the proposed control system design, product throughput, emissions, energy consumption, estimated machine downtime or wear, or other such metrics.

Figure 4:
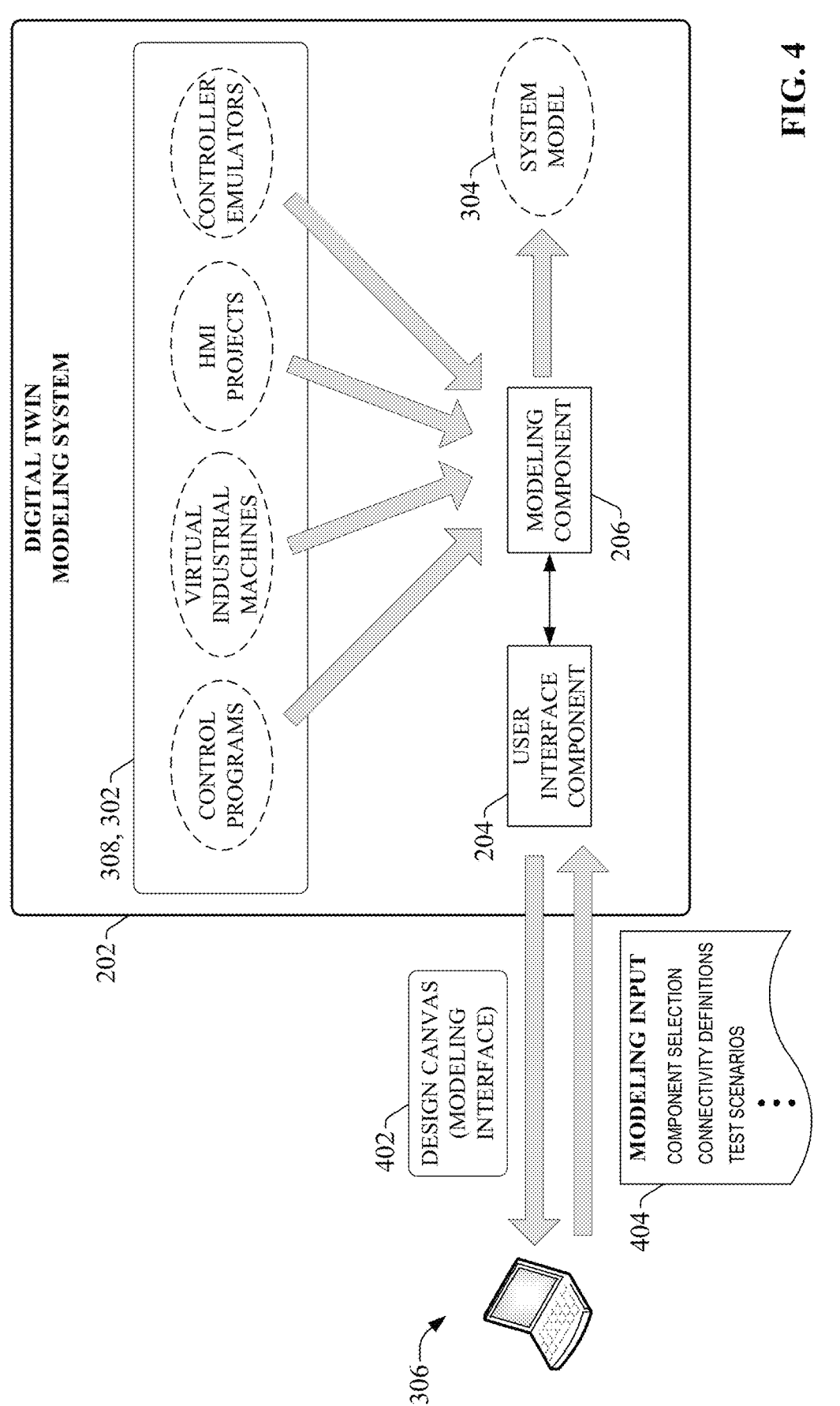
FIG. 4 is a diagram illustrating creation of a system model using services and tools provided by the digital twin modeling system.

FIG. 4 is a diagram illustrating creation of a system model 304 using services and tools provided by the digital twin modeling system 202 according to one or more embodiments. The modeling system's user interface component 204 can generate and deliver a modeling interface, referred to as a design canvas 402, to a client device 306. The design canvas 402 serves as the front end for the industrial digital twin modeling environment and offers interactive tools that allow the user to easily create a system model 304 of a proposed industrial control project and to execute scenario-based tests on the model 304. Through interaction with the design canvas 402, the user can submit modeling input 404 for defining components of the system model 304, connectivity between the elements, inputs and parameters to be applied to test simulations of the model 304, test scenarios to be simulated, or other such modeling input 404.

In general, a system model 304 is created by adding components to the design canvas 402 and defining connections between the components. These components can include selected project files 308—e.g., industrial controller programming and configuration files, HMI project files, etc.—that are designed to be deployed to physical industrial devices (e.g., industrial controllers, HMI terminals, etc.) to configure the control system to monitor and control and industrial automation system. Other components that can be added to the canvas 402 for inclusion in the system model 304 include virtual models of industrial machines that make up the automation system to be controlled, as well as instances of any hosted applications 302 whose functionalities and resources may be required to execute portions of the system model 304 (e.g., controller emulators for emulating execution of a control program, simulation applications for simulating a virtual model of an industrial machine under control of an emulated control program, control program development applications, HMI development applications, etc.)

Figure 5:
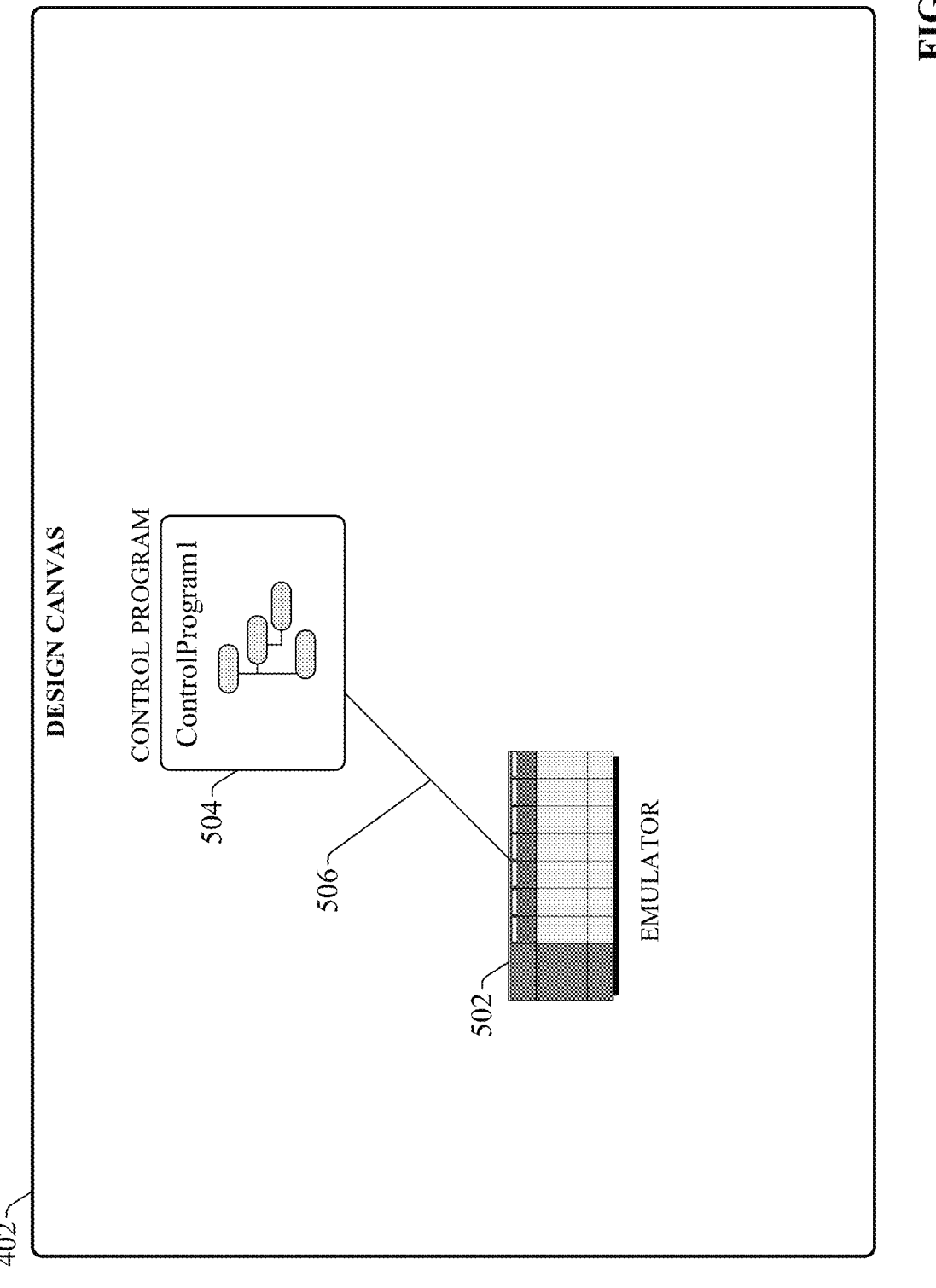
FIG. 5 is an example view of a design canvas depicting a connection between an industrial controller program file and a controller emulation application.

Some embodiments of the design canvas 402 can support a drag-and-drop workflow for adding and connecting model components and applications. FIG. 5 is an example view of the design canvas 402 depicting a connection between an industrial controller program file (e.g., a ladder logic program file) and a controller emulation application. In this example, the user has added an icon 504 representing the controller program file to the canvas 402; e.g., by browsing to the storage location of the control program file, or by selecting the icon 504 from a menu of available controller program files and dragging the icon 504 onto the canvas 402. The controller program file may have been developed using a control program development application, such as a ladder logic development platform (or a development platform used to develop control programs in other formats, such as function block diagrams, structured text, sequential function charts, or other control code formats).

In order to execute the control program represented by icon 504 within the virtual testing environment of the modeling system 202, the user has also added an icon 502 representing a controller emulator application. Controller emulation applications act as virtualized controllers that emulate execution of a control program without the need to install and execute the control program on a physical industrial controller. The controller emulation application can be one of multiple applications 302 hosted by the modeling system 202 to support execution of the various components of the system model 304. To specify that the emulation application is to be used to execute the industrial control program during the test execution, the user has defined a connection between the icons 504 and 502, represented as line 506 connecting icon 502 to icon 504. The system's modeling component 206 interprets the project components represented by icons 504 and 502, and the mapping between the two, as an instruction to execute the control program represented by icon 504 using an instance of the controller emulation application represented by icon 502, and adds this instruction to the system model 304. Other types of connections between project components can also be defined. For example, the system 202 can also allow users to define connections between virtual machine models that have been added to the canvas 402 to indicate functional relationships between the machines corresponding to the models.

Using this general workflow, the user can interact with the design canvas 402 to add other project components to the model 304, and to define connections or mappings between selected project components indicating functional relationships between the components. This can include, for example, linking a project file (e.g., a controller configuration file, an HMI project file, a device configuration file, a virtual machine model, etc.) to the hosted application 302 to be used by the model 304 to execute the file (e.g., a control program development application such as a ladder logic platform, an HMI development platform, a controller emulator, a simulation platform for simulating virtual machine models, etc.). In another example, the user can add a virtual machine model to the canvas 402 as an icon, where the virtual machine model is a simulation-capable digital representation of one or more machines that make up the automation system to be controlled. The user can then link the icon for this virtual machine model to another icon representing the industrial control program to be used to monitor and control the corresponding machine. This link may be in addition to the link between the control program icon and an emulation icon representing the emulation application to be used to virtually execute the control program.

The system's modeling component 206 translates the project components added to the canvas 402 and the connections between the components into a complete system model 304 representing a simulation-capable and testable digital model of the industrial control system. An example system model can comprise emulated controllers, virtual representations of controlled machines and equipment, HMIs, or other components of the automation system and its corresponding control system.

Figure 6:
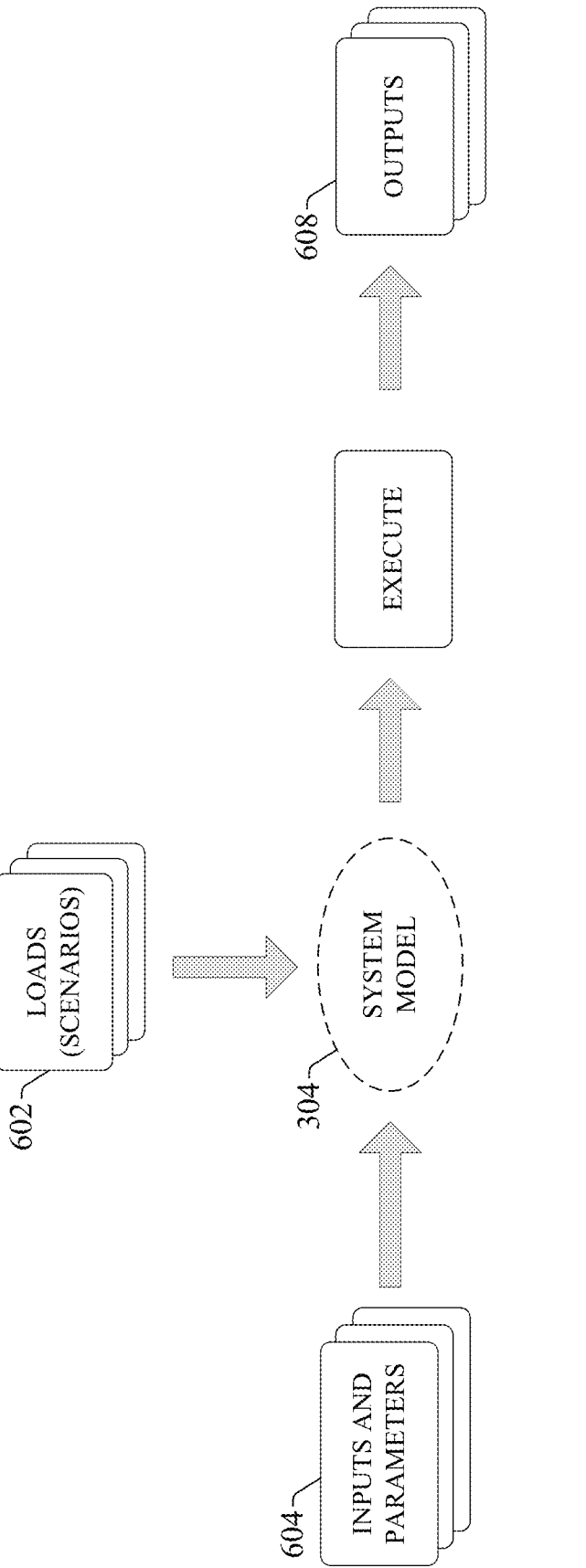
FIG. 6 is a block diagram illustrating an example test execution flow that can be performed by embodiments of the modeling system.

Once a model 304 representing a control system design to be tested is complete, the user can instruct the system 202 to perform test executions or applications on the completed model 304. FIG. 6 is a diagram illustrating an example test execution flow that can be performed by embodiments of the modeling system 202. Prior to performing a test execution, or a series of test executions, the user can define one or more loads 602, which represent operating scenarios or conditions of the automation system to be simulated and testing using the model 304. These loads can represent specific operations or operating modes that can be performed by the physical automation system, and which are to be tested against the system model 304. For example, a load 602 may represent a machine startup sequence, a machine shutdown sequence, production of different types of products or materials by the automation system, or other such operating scenarios.

In addition, the system 202 allows the user to define sets of inputs 604 into the model 304, as well as parameters to be applied to the model 304 during execution of the test execution. Through interaction with the canvas 402, users can map the inputs 604 to icons representing data sources that generate data consumed or processed by the modeled control system during operation. Users can define one or more sets of values for these inputs 604, and the system 202 will perform separate test executions on each of the sets of inputs 604. The user can also define values of initial parameters to be applied to the system model 304, as well as data sinks indicating storage locations at which results of the test executions (e.g., output data 608) are to be stored.

As will be described in more detail below, test executions performed on the system model 304 simulate operation of the modeled automation system under control of the proposed control system (as represented by the components of the system model 304 and the user-defined connections between the components) and under the conditions represented by the loads 602 and inputs 604. The modeling system 202 can perform multiple test executions across variations in the system model 304, loads 602, or inputs 604, and generate results of these test executions as output data 608 for further analysis or comparison. Output data 608 can comprise estimated values of one or more performance metrics for the modeled control system, including but not limited to various KPIs, product throughput, energy consumption, emissions, machine wear, machine downtime, or other such metrics.

Figure 7:
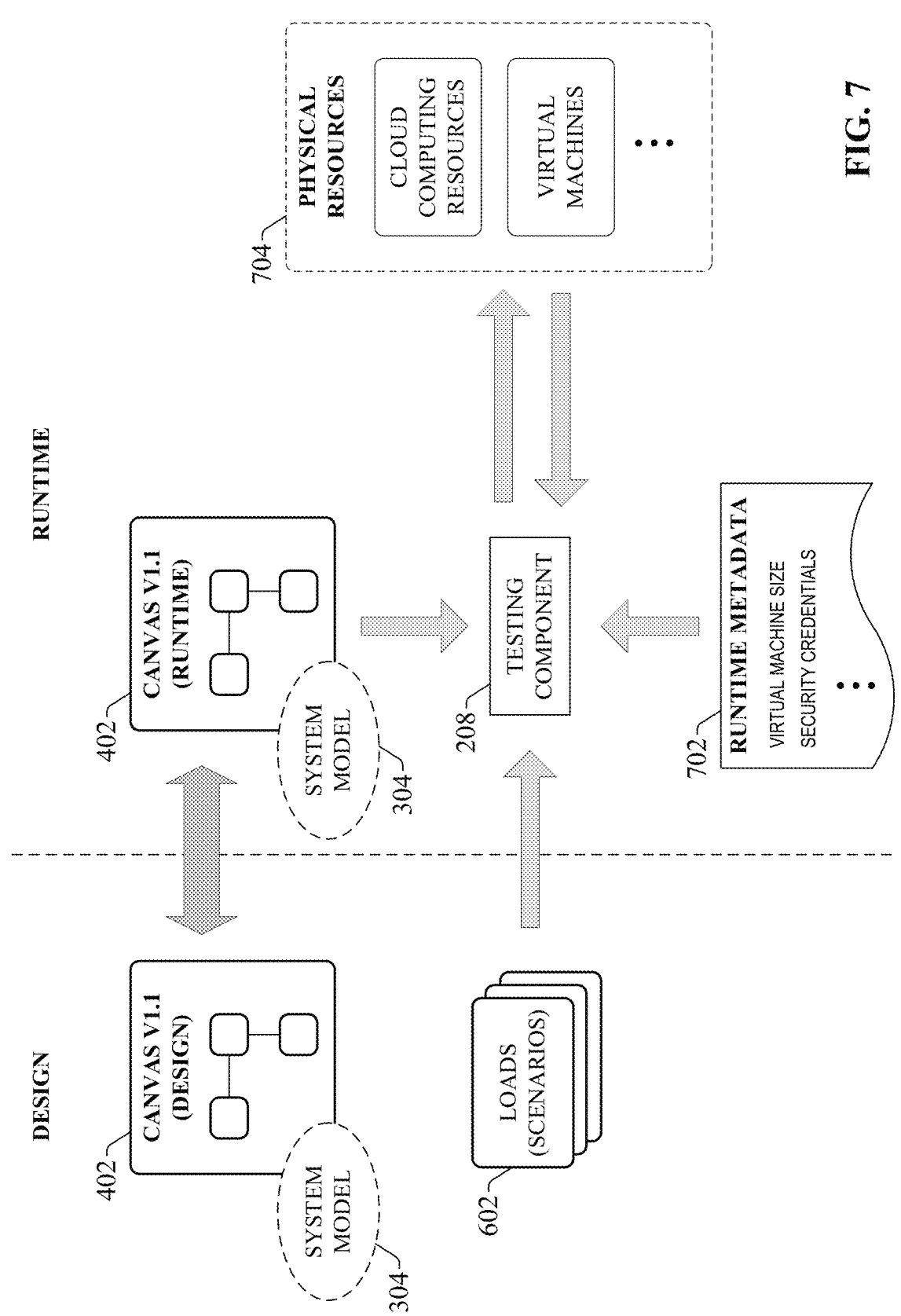
FIG. 7 is a diagram illustrating transitions between design and runtime modes of a modeling canvas.

During testing, the user interface component 204 allows the user to switch the canvas 402 between a design mode and a runtime (or testing) mode. FIG. 7 is a diagram illustrating transitions between the design and runtime modes. During design mode, represented on the left side of FIG. 7, the user can build the system model 304 by adding and linking components, and define sets of loads 602, inputs 604, and parameters to be tested against the system model 304, as described above. The user can initiate runtime mode—represented on the right side of FIG. 7—by selecting an appropriate control rendered on the canvas 402 (e.g., a play button), which causes the canvas 402 to switch to runtime mode and initiates the test executions. During runtime, the testing component 208 performs a test execution on each combination of defined loads 602, inputs 604, and parameters, where each test execution simulates operation of the modeled automation system under control of the control system represented by the system model 304, and under the conditions represented by the respective sets of loads 602, inputs 604, and parameters.

Figure 8:
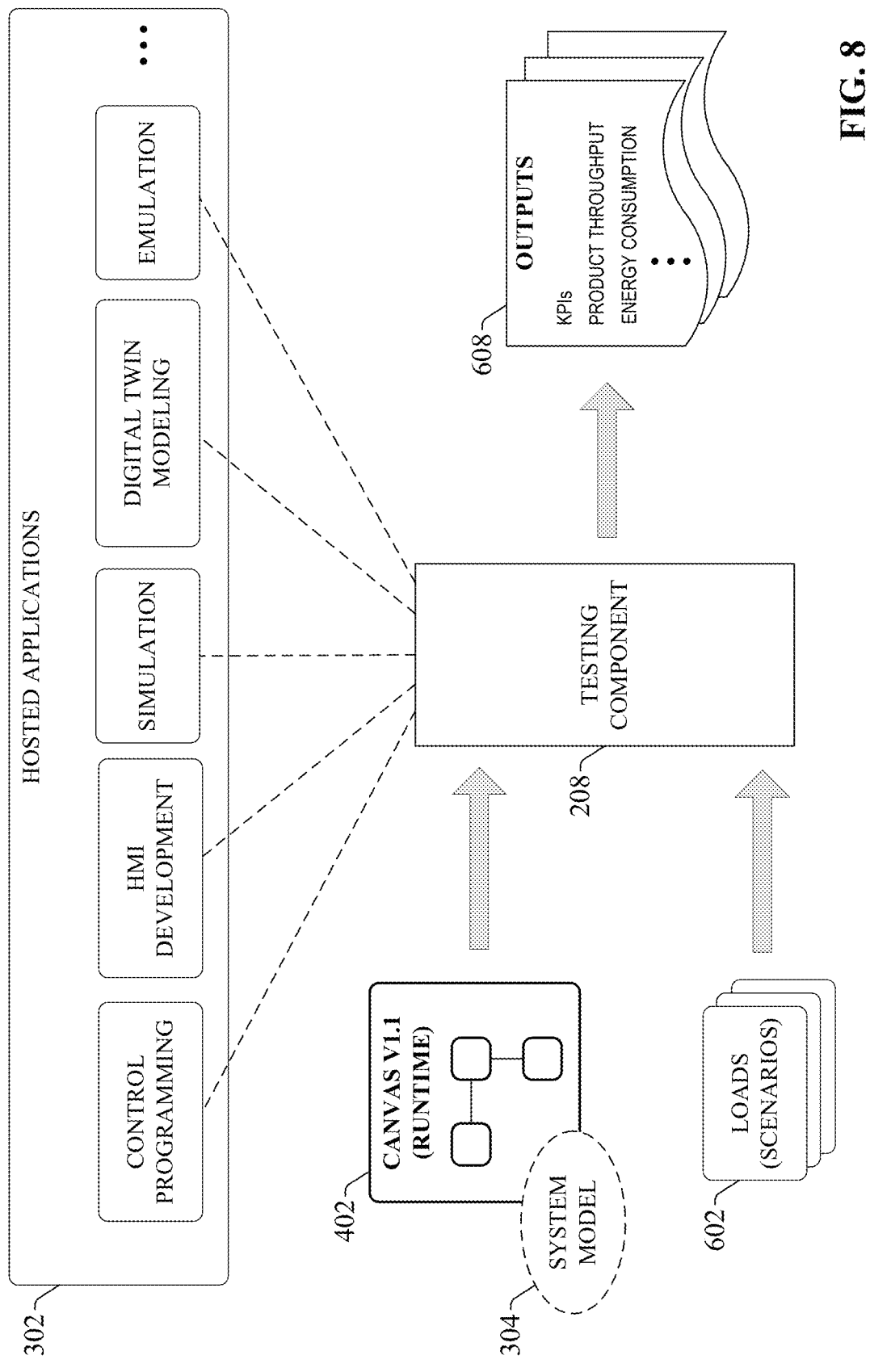
FIG. 8 is a diagram illustrating the use of hosted applications to perform a test execution of a system model.

To perform a test execution during runtime, the testing component 208 reads user-defined information contained in the system model 304 and depicted on the canvas 402—representing a version of the control system design—and deploys executable components of the model 304 to one or more physical resources 704 for execution. The testing component 208 also accesses and utilizes any of the hosted applications 302 necessary to execute portions of the model 304 as needed. FIG. 8 is a diagram illustrating the use of hosted applications 302 to perform a test execution of the system model 304. In an example scenario, if a portion of the model 304 requires emulation of an industrial control program by a controller emulator application (as configured in the example canvas 402 depicted in FIG. 5), the testing component 208 can open a project within the hosted emulator application (an application 302 hosted by the modeling system 202) for emulated execution of the control program, and deploy the project to a virtual machine (a physical resource 704; see FIG. 7) or another cloud computing resource on a cloud platform for execution as part of the greater test execution. Other components of the system model 304 that require execution on one of the hosted applications 302 can be executed in a similar manner, such that the testing component 208 opens a project or instance of the hosted application (e.g., an emulator, a simulation application, an HMI runtime application, a digital model simulation platform, etc.) for execution of the model component (e.g., a control program file, an HMI application, a virtual machine model, etc.) and deploys the project or instance to an appropriate physical resource 704 for execution of the model component. The testing component 208 coordinates across the various applications 302 and resources 704, controlling where the components of the model 304 and their corresponding applications 302 are physically deployed. The testing component 208 also defines the models 304 being run, the loads 602 or scenarios being run, and their inputs.

Returning to FIG. 7, the testing component 208 can also leverage runtime metadata 702 as part of these deployments. This runtime metadata 702 comprises information that is not directly defined in the canvas 402 as part of the control system design, but which may be required to execute parts of the model 304, such as the size of a virtual machine required to execute a project, security credentials, or other such information. The testing component 208 can use this metadata 702 as needed in connection with performing the test execution (e.g., selecting an appropriately sized virtual machine for executing a portion of the model 304 in accordance with defined virtual machine size requirements, using the security credentials to access protected applications or physical resources, etc.).

While in the runtime state, the canvas 402 can allow the user to selectively expand and view specific components of the model 304. For example, selecting an icon representing an industrial control program (e.g., icon 504) can cause the user interface component 204 to render an instance of a control program development application (one of the hosted applications 302) in a window of the canvas 402, and to display the selected control program in the window within the control program development platform. During the test execution, the program can be rendered in runtime mode, such that the current simulated states of the data values and program elements are rendered on the appropriate program elements. In some embodiments, the system 202 can also allow the user to edit the control program via interaction with the runtime display while the program is being emulated as part of the runtime system model 304. Alternatively, the system 202 may require the user to transition the canvas 402 back to design mode before permitting edits to the program. Other applications 302 used to view the various components or programs of the model 304—e.g., HMI applications, virtual machine models, etc.—can be similarly invoked via interaction with the runtime or design canvas 402.

If desired, multiple different applications 302 can be invoked and displayed simultaneously on the canvas 402, offering a simultaneous view of multiple components of the system model 304 during the text execution. In an example scenario, the user can selectively display an industrial control program on a first window for a control program development application, and a corresponding HMI application on a second window for an HMI development application. This allows the user to view and edit the control program as it is being emulated and to view how the edit will be reflected on the HMI application.

As noted above, the testing component 208 can perform test executions across different loads 602 and inputs 604, as well as across different versions of the system model 304 defined and saved by the user. The testing component 208 will generate and store results of these different test executions as output data 608 for analysis or comparison. This output data 608 can comprise estimated values of one or more performance metrics for the modeled control system, including but not limited to KPIs, product throughput, energy consumption, emissions, machine wear, machine downtime, or other such metrics. Each time a test execution is performed, the testing component 208 stores output data 608 generated by the test execution at a specified storage location as an iteration.

The runtime canvas 402 can be switched back to the design version of the canvas 402 at any time, allowing the user to modify the system model 304 as needed. The system 202 also allows the user to modify configuration or runtimes settings of any of the hosted applications 302 while the canvas 402 is in design mode. If desired, the user can edit the system model 304 while in design mode and save the modified model 304 as a new version of the model, while retaining the previous version of the model 304. Each version of the model 304 represents a candidate version of the control system design, as well as the design of the automation system itself (e.g., as represented by virtual machine models included in the system model 304, which are simulated as part of the system model 304). The system 202 allows the user to perform test executions on any stored version of the system model 304, including running test executions on multiple versions of the system model 304 simultaneously. Output data 608 generated by these test executions for the different versions of the model 304 are stored at designated sink locations and can be rendered for review by the user interface component 204.

Figure 9:
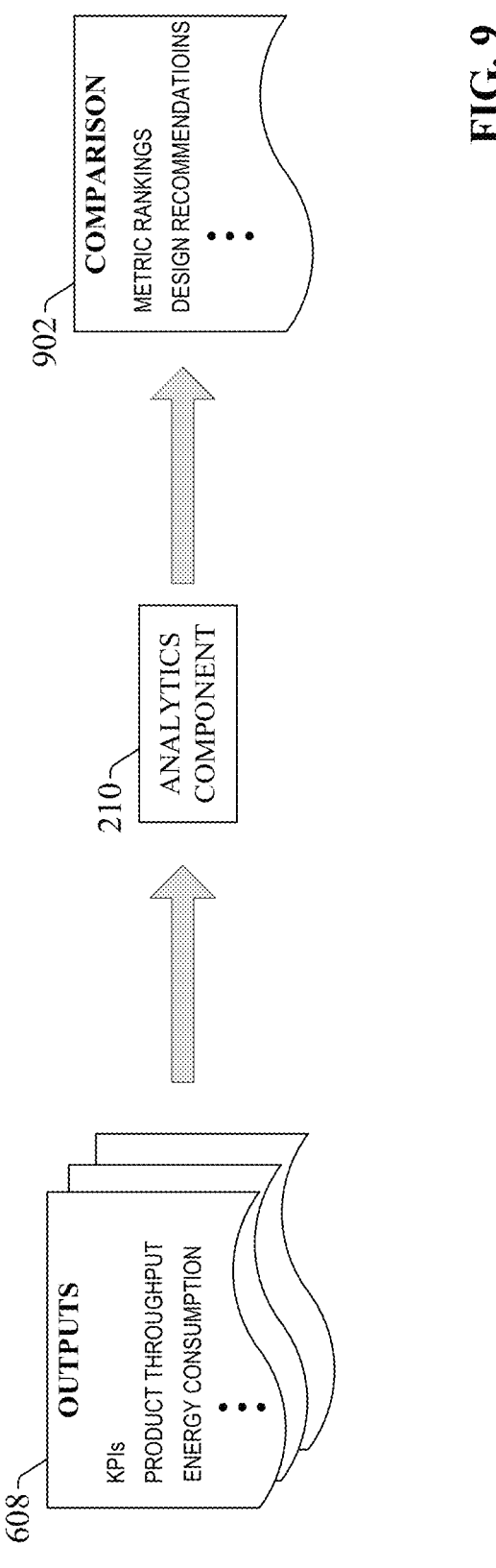
FIG. 9 is a diagram illustrating application of comparative analytics to sets of output data generated by test executions of a system model.

In some embodiments, the system 202 can also perform comparative analytics on different sets of output data 608. FIG. 9 is a diagram illustrating application of comparative analytics to sets of output data 608 generated by test executions. The system's analytics component 210 can collectively analyze multiple sets of output data 608 for respective different versions of the model 304 (e.g., versions of interest selected by the user), and generate comparison data 902 based on the analysis that conveys differences in expected or predicted performance metrics between the different control system versions. Example comparison data 902 may display a ranking of the different versions in terms of one or more performance metrics of interest (e.g., a ranking of the versions based on product throughput, emissions, energy consumption, machine downtime, etc.). In some embodiments, the analytics component 210 may also identify, based on collective analysis of the output data 608 together with the control system designs that gave rise to the respective data sets, control design modifications that may improve one or more of the performance metrics, and generate, as part of the comparison data 902, a recommendation to implement the design modification. Example recommended design modifications can include, but are not limited to, modifications to a control program, replacement of a machine or device represented in the model 304 with a different machine or device, modifications to device or network configuration settings, or other such design modifications.

Figure 10:
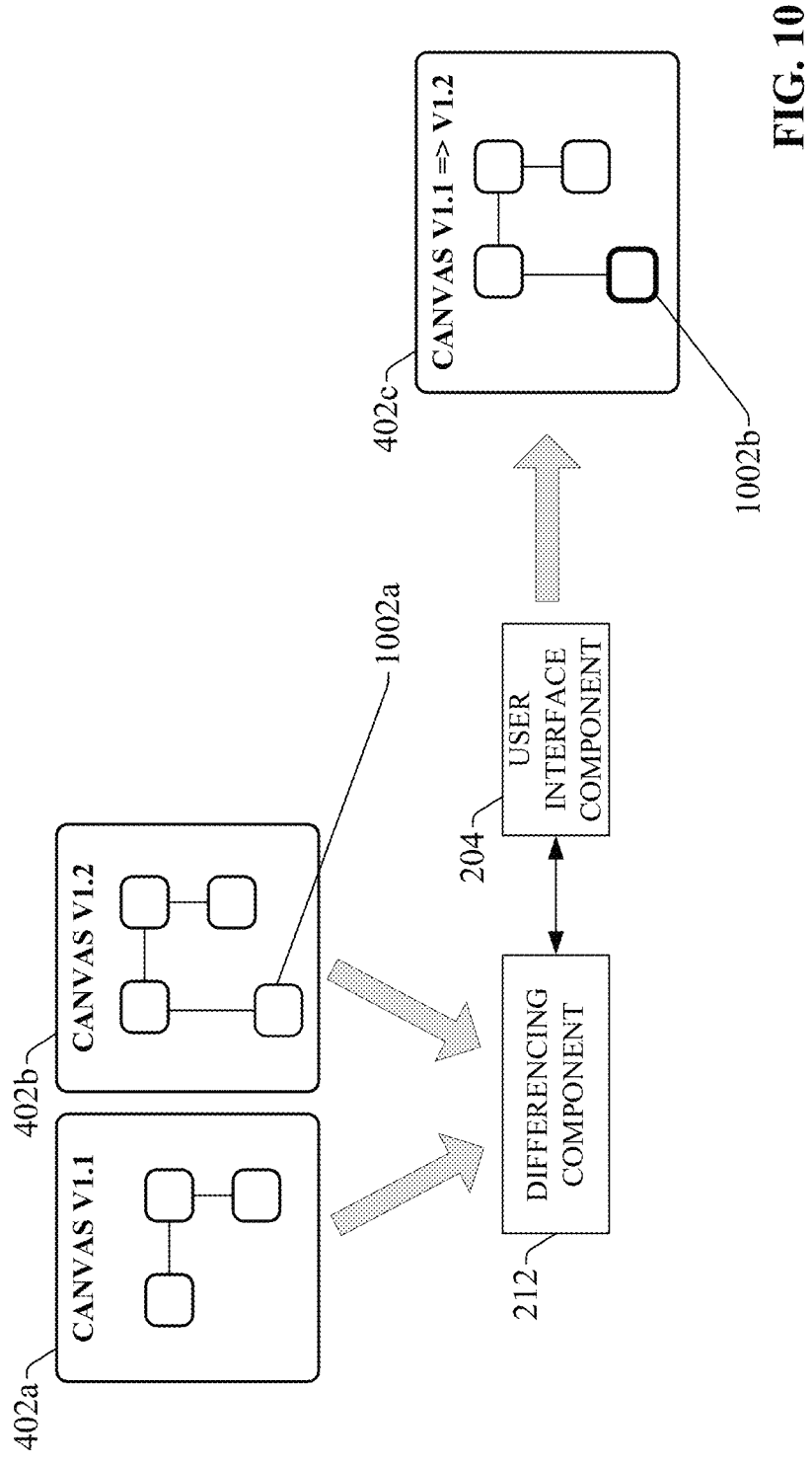
FIG. 10 is a diagram illustrating difference processing applied to two versions of a system model represented by respective different versions of a canvas.

Each version of the system model 304 can be represented by its own canvas 402, which can be labeled according to its version number (e.g., V1.1, V1.2, etc.). In some embodiments, the modeling system 202 can include a visual differencing engine that identifies differences between versions of the system model 304. FIG. 10 is a diagram illustrating difference processing applied to two versions of a system model 304, represented by respective different versions of the canvas 402a and 402b. In this example, the user has selected two different versions of the canvas 402a (V1.1) and 402b (V1.2) for comparison. Version V1.2 differs from version V1.1 by the addition of an icon 1002a representing a new system component (e.g., a controller program, a machine model, an HMI application, etc.). The system's differencing component 212 can compare the two system models 304 corresponding to the two versions of the canvas 402a and 402b, identify differences between the two versions, and render a version of the canvas 402c that graphically depicts the differences between the two compared canvases 402a and 402b. The generated canvas 402c can graphically highlight such variations as the addition or removal of controllers or other devices, new data sinks, new loads or scenarios, or other such differences. The user interface component 204 can use highlighting to depict differences between the versions being compared. In the illustrated example, the added icon 1002b representing a new component that was added to version V1.2 is graphically highlighted on the canvas 402c to indicate that the icon 1002b represents a newly added element. Highlighting can also be used to denote the removal of an element, where a highlight can be color-coded to indicate whether an element has been added or removed. Other types of graphical renderings can be used to convey other types of differences between the two designs. Other types of differences that can be identified and graphically indicated on the differencing canvas 402c can include changes in controller emulation types, modifications to a network port, edits to a control program or HMI application, edits to a device configuration setting, or other such design differences.

Figure 11:
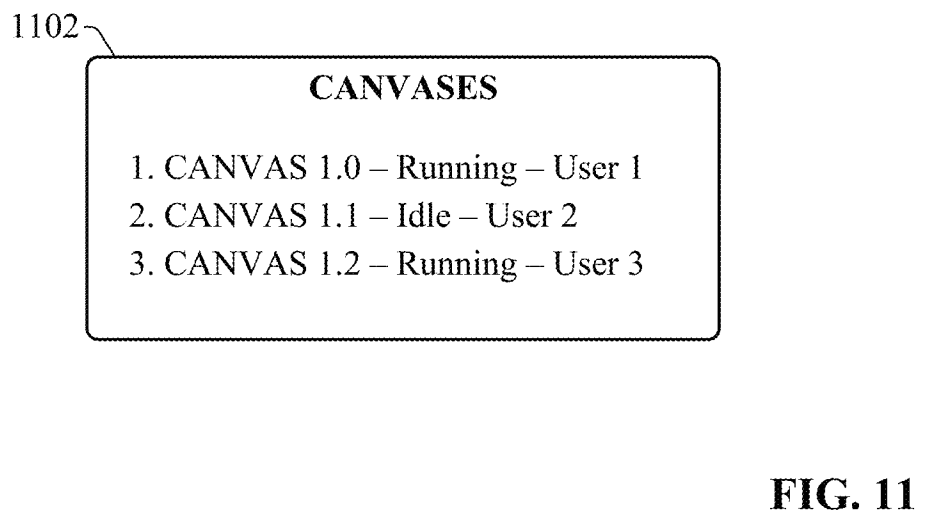

The user interface component 204 can also render informational windows on the user's client device that allow the user to browse the statuses of the various canvases 402 that have been designed and stored on the system 202. FIG. 11 is an example canvas summary window 1102 that can be rendered by the user interface component 204. Window 1102 lists the active canvases 402 representing different versions of a control project (V1.0, V1.1, and V1.2 in the illustrated example), and also displays status information for each canvas 402, including but not limited to a current running status of the canvas 402 (e.g., Running, Idle, etc.) and an identity of a user who is currently editing or running the canvas 402. The window 1102 may also identify loads or scenarios that are currently being run on any of the running canvases 402. In some embodiments, a user can select a canvas 402 from among those listed on the window 1102 to invoke the canvas 402 on his or her client device for viewing.

Figure 12:
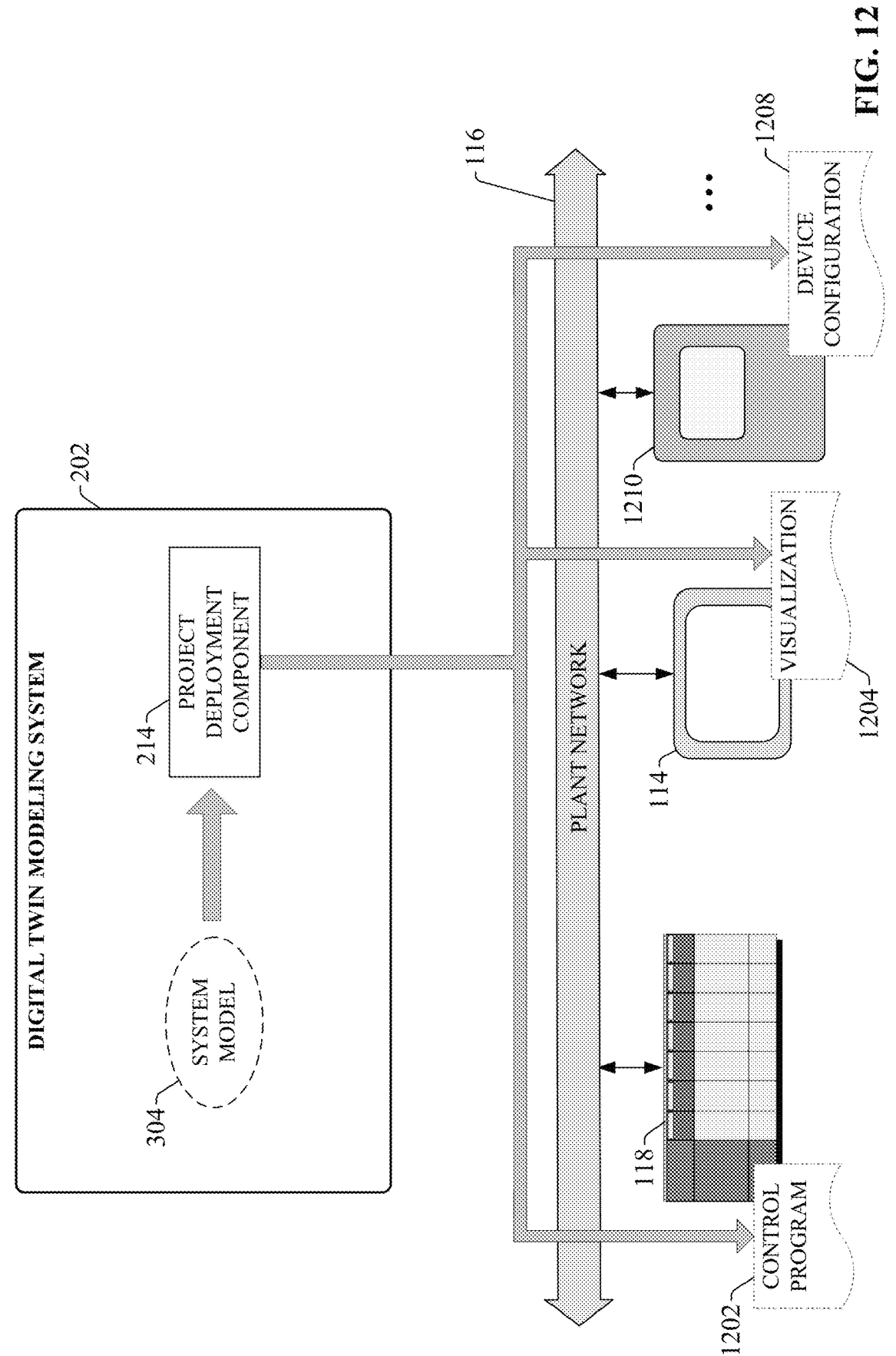
FIG. 12 is a diagram illustrating commissioning of a system model.

When testing of a system model 304 for a given automation system has been completed and the corresponding control system design approved, the finalized control system design can be commissioned by deploying executable software components of the model 304 to one or more target control devices for execution. This can be done by obtaining the executable software components that had been imported into the model 304 (e.g., industrial control programs, device configuration files, HMI applications, etc.) and installing these components on their corresponding field devices. Some embodiments of the digital twin modeling system 202 can include commissioning tools that simplify the process of commissioning finalized and approved control system designs to the physical hardware in the field. FIG. 12 is a diagram illustrating commissioning of a system model 304. Project deployment component 214 can translate a completed system model 304 into one or more executable files or configuration files that can be stored and executed on respective target industrial devices of the automation system (e.g., industrial controllers 118, HMI terminals 114 or other types of visualization systems, motor drives 1210, telemetry devices, vision systems, safety relays, etc.). The executable files can include the project files 308 that were imported into the model 304, tested within the context of the aggregate system model 304, and modified as needed until the test executions yielded satisfactory results. In some embodiments, the project deployment component 214 can also export bill of materials information for the completed system model 304, which itemizes devices and equipment of the automation system design as defined in the model 304. To generate this bill of materials information, the project deployment component 214 can draw from any of the components or elements of the system model 304, including but not limited to industrial controller configuration files (including I/O module configuration data, from which some of the equipment may be identified), digital asset models or virtual machine models, or other such model components.

The industrial digital twin modeling system 202 described herein offers an integrated modeling, testing, and development environment that allows a user to easily construct digital models of proposed industrial control systems, and that brings together functionalities of multiple hosted applications to simulate and test these control system designs. The system 202 can coordinate between the various hosted applications in connection with running test executions on the model, and can generate comparative metrics between different proposed versions of a control system design that aid in converging on a finalized design.

Figure 13B:
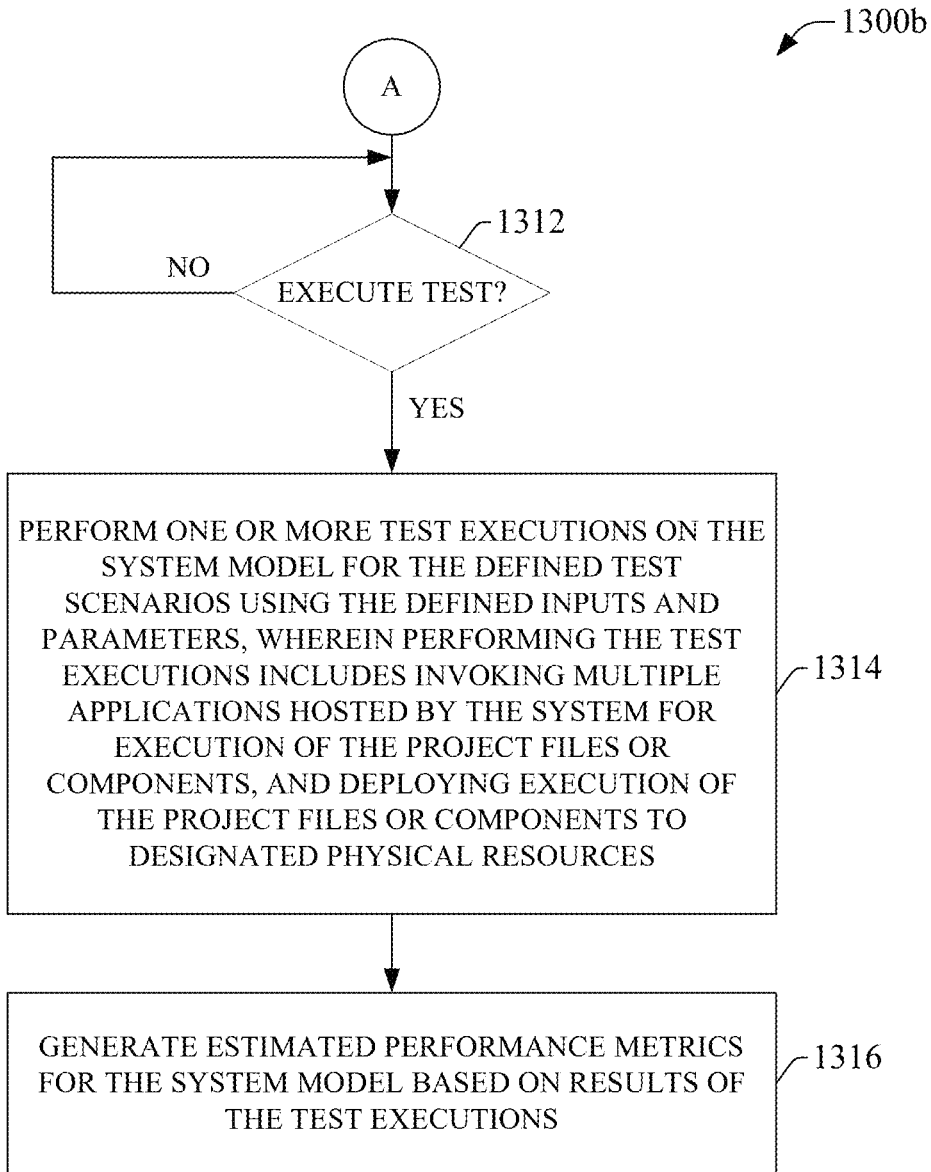
FIG. 13*b* is a flowchart of a second part of the example methodology for digitally modeling an industrial automation system and its associated control system, and generating test executions on the resulting system model.

FIGS. 13a-13b illustrate a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13a illustrates a first part of an example methodology 1300a for digitally modeling an industrial automation system and its associated control system, and generating test executions on the resulting system model. Initially, at 1302, a model development canvas for creation of industrial system models is rendered on a client device by a digital twin modeling system. At 1304, the system receives, via interaction with the canvas, selection of project files or components to be included in a system model representing an industrial automation system and its associated control system. The project files or components can be selected for inclusion in the model by adding icons representing the files or components to the canvas. The project files or components can include, but are not limited to, control code intended for execution on an industrial controller (e.g., ladder logic, sequential function charts, structured text, function block diagrams, etc.) to facilitate monitoring and control of the industrial automation system, device configuration data (e.g., industrial controller configuration files, motor drive configuration files, etc.), visualization applications (e.g., HMI applications, AR/VR content, etc.), simulation-capable virtual models of industrial machines that make up the automation system to be controlled, or other such control project data. The added components can also include instances of, or references to, applications hosted by the system that may be required to support execution of the project files, such as control program development applications, HMI development applications, controller emulators, simulation platforms, or other such applications.

At 1306, the system further receives, via interaction with the canvas, definitions of connections between the icons representing the project files or components that were added to the canvas at step 1304. These connections define functional relationships between the project files or components.

For example, the system may interpret the mapping between an icon representing a control program and an icon representing a controller emulator as an instruction to execute the control program using an instance of the controller emulator. This instruction is encoded in the system model.

At 1308, a system model of the industrial automation system and its control system is generated based on components added to the project at step 1304 and the connections defined at step 1306. At 1310, the system receives definitions of test scenarios (or loads), inputs and parameters to be tested using the system model.

The methodology then continues with the second part 1300*b* illustrated in FIG. 13*b*. At 1312, a determination is made as to whether an instruction to execute a test on the system model is received. If an instruction to test the model is received (YES at step 1312), the methodology proceeds to step 1314, where one or more test executions are performed on the system model for the defined test scenarios using the defined inputs and parameters. The test execution simulates operation of the automation system under control of the modeled control system, and under the defined test scenarios, using the system model. To perform the test execution, the system can invoke multiple applications hosted by the system as needed to execute the project files or components that were included in the model (e.g., controller emulators, simulation platforms, etc.) and deploy execution of these components to designated physical resources. For example, to emulate execution of a control program, the system can open an instance of the control program in a control emulator application, and execute the emulation project on a virtual machine or another computing resource. The system can coordinate between various running instances of the project components in order to accurately simulation the automation system's operation and estimate performance metrics for the control system.

At 1316, estimated performance metrics for the system model are generated based on results of the test executions performed at step 1314. Example performance metrics that can be generated based on the test executions can include, but are not limited to, KPIs of the automation system under control of the proposed control system design, product throughput, emissions, energy consumption, estimated machine downtime or wear, or other such metrics.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, Open Platform Communications Unified Architecture (OPC-UA), and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
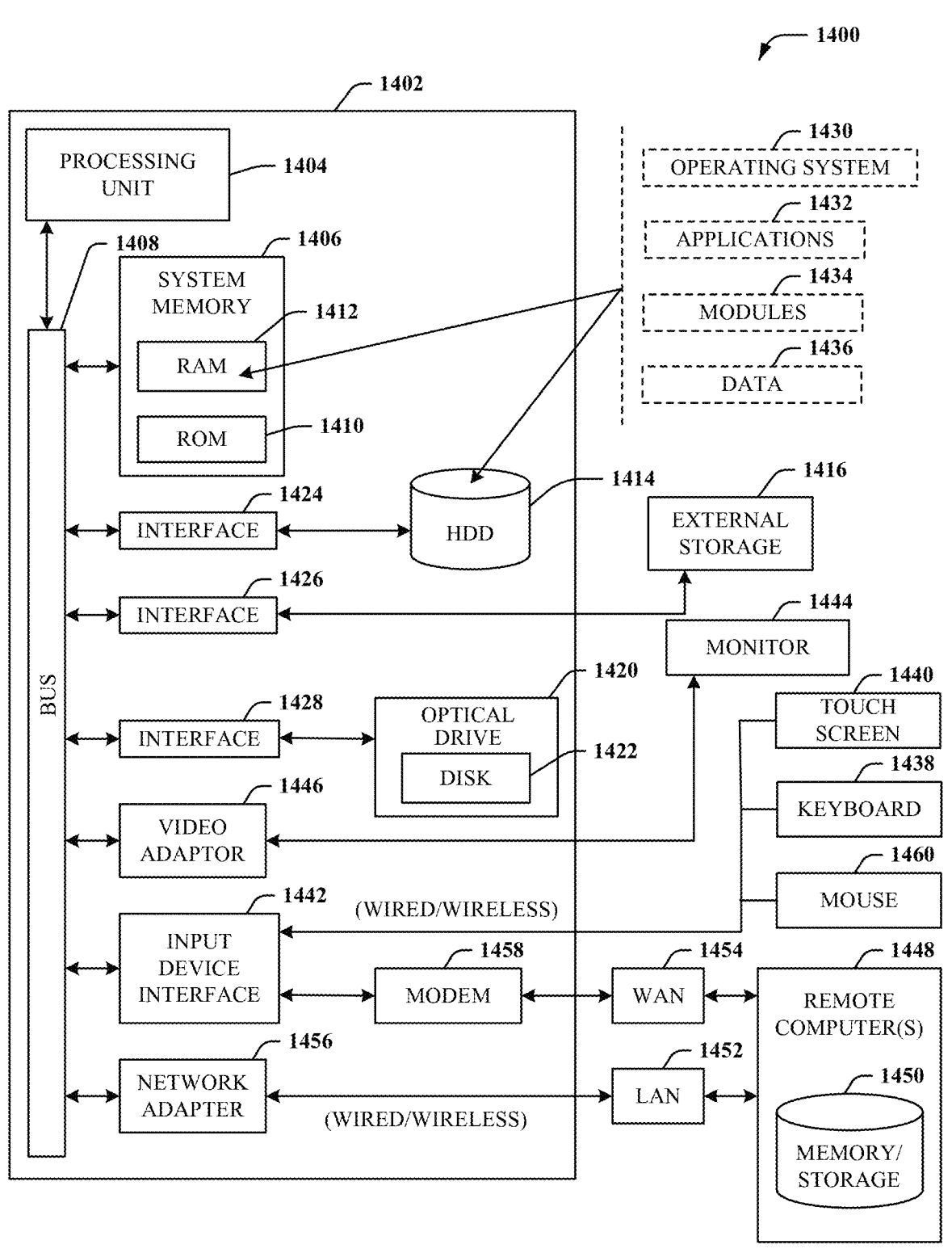
FIG. 14 is an example computing environment.
Figure 15:
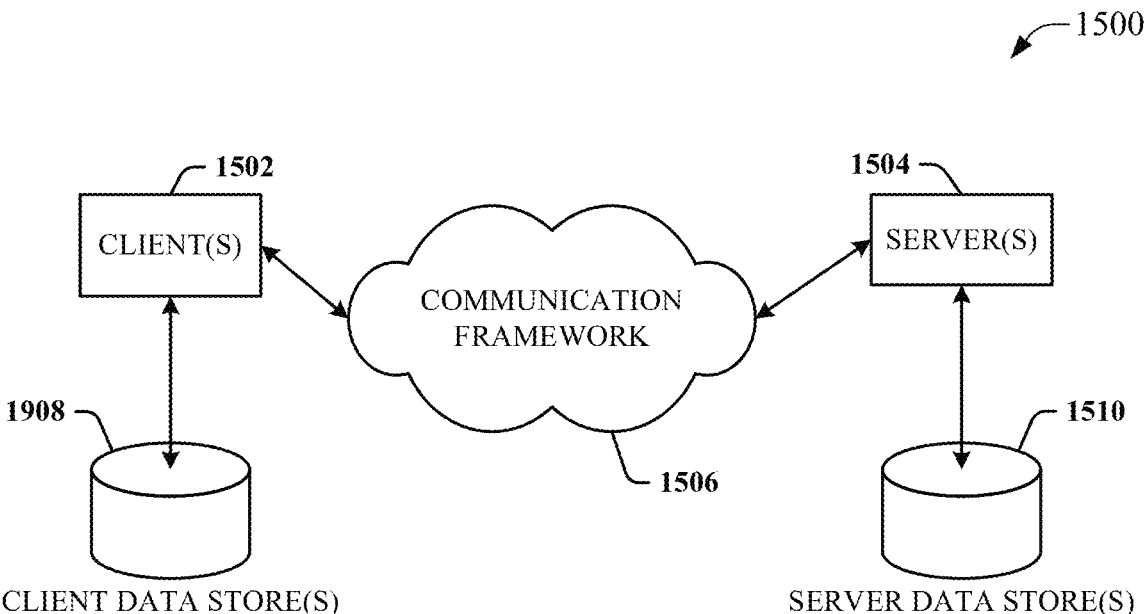
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown).

Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for application programs 1432. Runtime environments are consistent execution environments that allow application programs 1432 to run on any operating system that includes the runtime environment. Similarly, operating system 1430 can support containers, and application programs 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1460. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1444 or other type of display device can be also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also include a wireless access point (AP) disposed thereon for communicating with the adapter 1456 in a wireless mode.

When used in a WAN networking environment, the computer 1402 can include a modem 1458 or can be connected to a communications server on the WAN 1454 via other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1452 or WAN 1454 e.g., by the adapter 1456 or modem 1458, respectively. Upon connecting the computer 1402 to an associated cloud storage system, the external storage interface 1426 can, with the aid of the adapter 1456 and/or modem 1458, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1904 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1902 are operably connected to one or more client data store(s) 1508 that can be employed to store information local to the client(s) 1502. Similarly, the server (s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a user interface component configured to
render, a design canvas on a client device,
render, on the design canvas, first icons representing development and testing applications that are hosted on the system or linked to by the system, wherein the development and testing applications comprise at least an industrial control programming application and a controller emulation application,
receive, via interaction with the design canvas, selections of industrial control project files to be included in a system model, wherein the industrial control project files comprise at least an industrial control program, a human-machine interface (HMI) application, and a virtual model of an industrial machine,
render, on the design canvas, second icons representing the industrial control project files, and
receive, via interaction with the design canvas, a link between a selected one of the second icons representing an industrial control project file, of the industrial control project files, and a selected one of the first icons representing an application, of the development and testing applications, that is to execute the one of the industrial control project files;
a modeling component configured to generate the system model representing an industrial control system based on the industrial control project files and the link between the selected one of the second icons and the selected one of the first icons; and
a testing component configured to perform a test execution on the system model that simulates operation of the industrial control system and generates performance metric data for the system model based on the test execution, wherein
the link instructs the testing component to execute, as part of the test execution, the industrial control project file using an instance of the application.

2. The system of claim 1, wherein the applications further comprise at least one of an HMI development application or an industrial simulation application.

3. The system of claim 1, wherein the industrial control project files further comprise one or more virtual models of machines included in the industrial control system.

4. The system of claim 1, wherein the testing component is configured to execute the industrial control project file in the instance of an application defined by the link as being linked to the industrial control project file.

5. The system of claim 4, wherein the testing component is further configured to open the instance of the application on a virtual machine instantiated on a cloud platform and to execute the industrial control project file in the instance using the virtual machine.

6. The system of claim 1, wherein the link is represented on the project canvas as a line connecting the one of the first icons and the one of the second icons.

7. The system of claim 1, wherein
the user interface is further configured to receive, via interaction with the design canvas, definitions of operating scenarios of the industrial control system to be tested, and
the testing component is configured to perform respective test executions on the system model for the operating scenarios.

8. The system of claim 7, wherein the test scenarios comprise at least one of a machine startup sequence, a machine shutdown sequence, or a production sequence for producing a type of product or material.

9. The system of claim 1, wherein the performance metric data comprises estimations of at least one of key performance indicators for the industrial control system, product throughput, energy consumption, emissions, machine wear, or machine downtime.

10. The system of claim 1, wherein
the testing component is configured to perform test executions on multiple system models representing alternative designs for the industrial control system and to generate multiple sets of the performance metric data for the multiple system models,
the executable components further comprise an analytics component configured to perform comparative analytics on the multiple sets of the performance metric data; and
the user interface component is further configured to render a result of the comparative analytics.

11. The system of claim 10, wherein the result of the comparative analytics comprises at least one of a ranking of multiple system models as a function of a key performance metric or a recommendation for modifying one of the alternative designs in a manner predicted to improve a key performance metric of the industrial control system.

12. The system of claim 1, wherein
the executable components further comprise a differencing component configured to identify design differences between the system model and another system model representing another version of the industrial control system, and
the user interface component is further configured to render, on the design canvas, a representation of the system model that graphically indicates the differences between the system model and the other system model.

13. The system of claim 1, wherein the system executes on a cloud platform.

14. A method, comprising:

rendering, on a client device by a system comprising a processor, a design canvas;

rendering, by the system on the design canvas, first icons representing development and testing applications that are hosted on the system or linked to by the system, wherein the development and testing applications comprise at least an industrial control programming application and a controller emulation application;

receiving, by the system via interaction with the design canvas, selections of industrial control project files to be included in a system model representing an industrial automation system, wherein the industrial control project files comprise at least an industrial control program and a human-machine interface (HMI) application, and a virtual model of an industrial machine;

rendering, by the system on the design canvas, second icons representing the industrial control project files;

receiving, by the system via interaction with the design canvas, a link between a selected one of the second icons representing an industrial control project file, of the industrial control project files, and a selected one of the first icons representing an application, of the development and testing applications, that is to execute the one of the industrial control project files;

generating, by the system, the system model based on the industrial control project files and the link between the selected one of the second icons and the selected one of the first icons;

performing, by the system, a test execution on the system model that simulates operation of the industrial automation system, wherein the performing comprises executing, as part of the test execution, the industrial control project file using an instance of the application in accordance with the link; and generating, by the system, performance metric data for the system model based on the test execution.

15. The method of claim 14, wherein the applications further comprise at least one of an HMI development application or an industrial simulation platform.

16. The method of claim 14, wherein the industrial control project files further comprise one or more virtual models of machines included in the industrial control system.

17. The method of claim 14, further comprising:

rendering, by the system, the link as a line connecting selected one of the second icons and the selected one of the first icons.

18. The method of claim 14, further comprising:

receiving, by the system via interaction with the design canvas, definitions of operating scenarios of the industrial automation system to be tested;

performing, by the system, respective test executions on the system model for the operating scenarios.

19. A non-transitory computer-readable medium having stored thereon instructions that, in response to execution, cause a system comprising a processor to perform operations, the operations comprising:

rendering, on a client device, a design canvas;

rendering, on the design canvas, first icons representing development and testing applications that are hosted on the system or linked to by the system, wherein the development and testing applications comprise at least an industrial control programming application and a controller emulation application;

receiving, via interaction with the design canvas, selections of industrial control project files to be included in a system model representing an industrial control system, wherein the industrial control project files comprise at least an industrial control program and a human-machine interface (HMI) application, and a virtual model of an industrial machine;

rendering, on the design canvas, second icons representing the industrial control project files;

receiving, via interaction with the design canvas, a link between a selected one of the second icons representing an industrial control project file, of the industrial control project files, and a selected one of the first icons representing an application, of the development and testing applications, to be used to execute the one of the industrial control project files;

generating the system model based on the industrial control project files and the link between the selected one of the second icons and the selected one of the first icons;

performing a test execution on the system model that simulates operation of the industrial automation system, wherein the performing comprises executing, as part of the test execution, the industrial control project file using an instance of the application based on the link; and generating performance metric data for the system model based on the test execution.

20. The non-transitory computer-readable medium of claim 19, wherein the applications further comprise at least one of an HMI development application or an industrial simulation platform.

\* \* \* \* \*